R. H. LEWIS.
DIRIGIBLE HEADLIGHT.
APPLICATION FILED JULY 3, 1917.

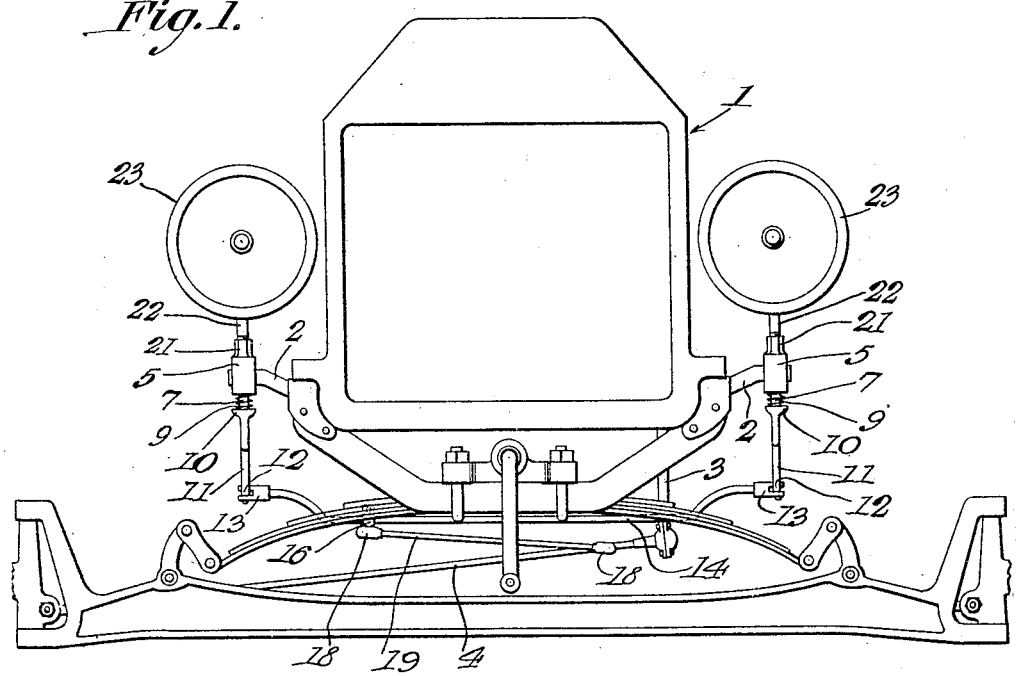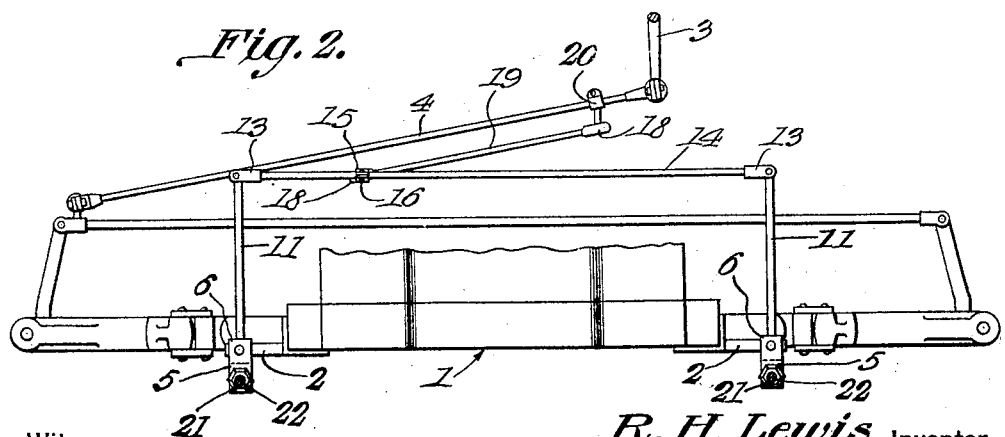

1,245,474.

Patented Nov. 6, 1917.
2 SHEETS—SHEET 2.

Witnesses

R. H. Lewis, Inventor by C. A. Snow & Co.
Attorneys

UNITED STATES PATENT OFFICE.

RALPH H. LEWIS, OF EMATON, KANSAS.

DIRIGIBLE HEADLIGHT.

1,245,474.  Specification of Letters Patent.  Patented Nov. 6, 1917.

Application filed July 2, 1917. Serial No. 178,356.

*To all whom it may concern:*

Be it known that I, RALPH H. LEWIS, a citizen of the United States, residing at Ematon, in the county of Stevens and State of Kansas, have invented a new and useful Dirigible Headlight, of which the following is a specification.

The subject of this invention is dirigible head light for automobiles and like vehicles and is designed principally for use on Ford automobiles.

The main object of the invention is to provide a dirigible attachment which may be applied to the automobile without changing the existing parts;

Another object is to provide a dirigible light which will not yield to slight wabbling of the steering wheels;

Still another object is to provide means for preventing shock to the lights or lamps;

Another object is to provide a firm, yet easily detachable socket for the lamp standard;

Another object is to provide a simple, durable and efficient dirigible light.

With the foregoing and other objects in view, which will appear as the description proceeds, the invention resides in the combination and arrangement of the parts and in the details of construction hereinafter described and claimed, it being understood that changes in the precise embodiment of the invention herein disclosed can be made within the scope of what is claimed, without departing from the spirit of the invention.

A practical embodiment of the invention is shown in the accompanying drawings, wherein:—

Figure 1 is a front elevation of the device showing the same attached to an automobile;

Fig. 2 is a top plan view of the same, detached;

Figure 3:
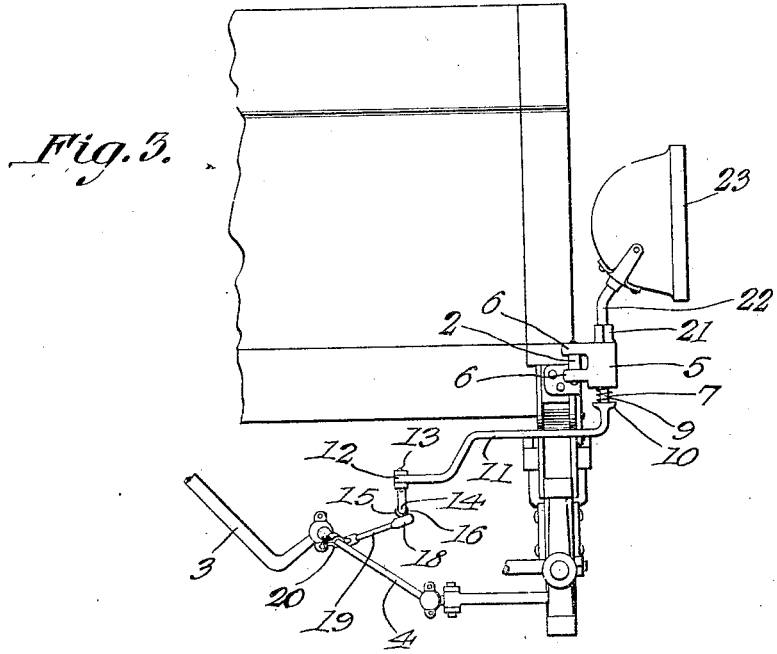
Fig. 3 is a side elevation.
Figure 4:
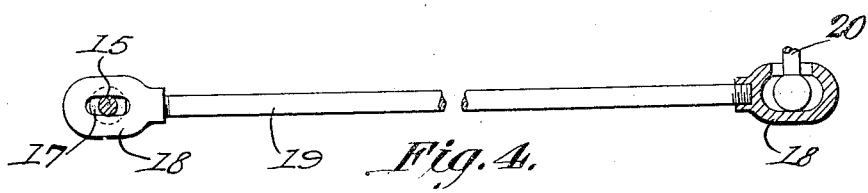
Fig. 4 is an enlarged detail of the connecting rod, parts being broken away.
Figure 5:
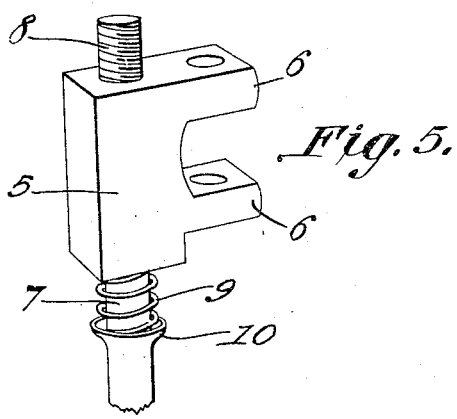
Fig. 5 is an enlarged detail perspective view of the journaling block, the lower lamp standard partly broken away.
Figure 6:
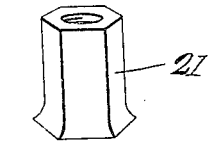
Fig. 6 is an enlarged detail perspective view of the coupling sleeve.

Referring to the drawings by numerals of reference:—

The front of an automobile is indicated at 1, and lamp brackets 2 are attached thereto in any ordinary manner. The automobile is provided with the usual steering post 3 which has pivotal connection with the steering rod 4.

A journaling block 5, formed with rearwardly extending spaced lugs 6, which lugs are provided with alining apertures for the reception of a bolt or other fastening means, is rigidly secured to each bracket 2 by means of such bolt or fastening means.

The stem 7 of a lower lamp standard turns in each journaling block, and each stem has a threaded end 8, the threads being preferably left handed. A coiled spring 9 surrounds each stem 7 and is confined between the journaling block and a flange or collar 10 formed on the standard. Each standard extends downwardly and merges into a rearwardly angled portion 11 which terminates in a flattened apertured portion 12, adapted for pivotal engagement with the yoke end 13, of a connecting link 14.

A bracket 15, formed to receive a clamping plate 16, is clamped about the connecting link 14, and this bracket is provided with a globular end 17 which is adapted to enter the socket 18 formed in one end of a connecting rod 19. The other end of the rod 19 has a ball and socket connection with a bracket 20, the yoke shaped end of which is clamped about the steering rod 4 by means of a bolt or otherwise.

A coupling sleeve 21, is threaded on the end 8 of the end stem 7 and also on the end of the staff 22 of each lamp standard, in which standards are supported lamps 23. The coupling sleeve 21 is interiorly threaded, the threads being right and left hand threads so as to engage the left hand threads of the stem 7 and the right hand threads of the staff 22 and draw the two together and bind them securely in place.

It will be noted that the socket 18 and its companion socket are elongated slightly. This is done for the purpose of allowing play so that slight movement caused by the usual wabbling of the wheels will not be imparted to the lamps.

Having thus described the invention, what is claimed as new and sought by Letters Patent, is:—

1. A dirigible light attachment, comprising journaling blocks, spaced lugs extending from each block and adapted to embrace and be attached to a lamp bracket, standards having stems turning in the blocks, coupling sleeves threaded on the stems and adapted to receive lamp standards, cushioning means between the blocks and the first mentioned standards, and mechanism for oscillating the standards.

2. A dirigible light attachment, comprising journaling blocks, spaced lugs on each block and adapted to embrace and be secured to a lamp bracket, standards, collars on the standards, stems on the standards rising from the collars and turning in the blocks, coiled springs surrounding the stems and abutting the collars and the blocks, sleeves threaded on the stems and adapted to receive lamp standards, and means for oscillating the first mentioned standards.

In testimony that I claim the foregoing as my own, I have hereto affixed my signature in the presence of two witnesses.

RALPH H. LEWIS.

Witnesses:
T. B. MOORE,
WM. STINEBURG.